(12) United States Patent  (10) Patent No.: US 11,258,382 B1
Wu  (45) Date of Patent: Feb. 22, 2022

(54) ROTATION SPEED REGULATION SYSTEM FOR ELECTRIC TOOL SWITCH

(71) Applicant: Suzhou Huazhijie Telecom Co., Ltd., Suzhou (CN)

(72) Inventor: Shiming Wu, Suzhou (CN)

(73) Assignee: SUZHOU HUAZHIJIE TELECOM CO., LTD., Suzhou (CN)

( * ) Notice: Subject to any disclaimer, the term of this patent is extended or adjusted under 35 U.S.C. 154(b) by 0 days.

(21) Appl. No.: 17/020,853

(22) Filed: Sep. 15, 2020

(30) Foreign Application Priority Data

Aug. 7, 2020 (CN) .......................... 202010786408.1

(51) Int. Cl.
 *G05B 5/00* (2006.01)
 *H02P 7/06* (2006.01)

(52) U.S. Cl.
 CPC .................................. *H02P 7/063* (2013.01)

(58) Field of Classification Search
 CPC .... H02P 7/063; H02P 3/00; H02P 4/00; H02P 7/00
 See application file for complete search history.

(56) References Cited

FOREIGN PATENT DOCUMENTS

CN 106439716 A * 2/2017

* cited by examiner

*Primary Examiner* — Karen Masih
(74) *Attorney, Agent, or Firm* — Bayramoglu Law Offices LLC

(57) ABSTRACT

A rotation speed regulation system for an electric tool switch includes a controller, a resistance regulating copper foil electrically connected to the controller, and a resistance regulating reed matched with the resistance regulating copper foil. The resistance regulating copper foil includes a first foil and a second foil separated from each other. The first foil is an intact long strip foil. The second foil includes a plurality of short-circuit gold fingers arranged at equal intervals in the middle part and a full-resistance foil and a zero-resistance foil at both ends. The width of the short-circuit gold finger is 0.27 mm, and the distance between two adjacent short-circuit gold fingers is 0.2 mm. An inclination angle α is formed between the short-circuit gold finger and the sliding direction of the resistance regulating contact end, α is 107°-110° and the length L of the contact strip is 2.3-2.9 mm.

4 Claims, 3 Drawing Sheets

ROTATION SPEED REGULATION SYSTEM FOR ELECTRIC TOOL SWITCH

CROSS REFERENCE TO THE RELATED APPLICATIONS

This application is based upon and claims priority to Chinese Patent Application No. 202010786408.1, filed on Aug. 7, 2020, the entire contents of which are incorporated herein by reference.

TECHNICAL FIELD

The present invention relates to the technical field of electric tool switches, and in particular to a rotation speed regulation system for an electric tool switch.

BACKGROUND

A rotation speed regulating mechanism is typically arranged in an electric tool switch to control the speed of the motor. The rotation speed regulating mechanism is controlled by a speed regulating switch to control a speed regulating reed to slide on the speed regulating copper foil, thereby changing a speed regulating signal received by an electric tool controller. According to the speed regulating signal, the controller changes the duty cycle of the output pulse signal to adjust the motor speed of the electric tool.

Commonly used speed regulating mechanisms, however, have an unreasonable design. In the whole speed regulating stroke of the speed regulating switch, the speed regulating signal curve received by the controller is not uniform, which leads to non-uniform speed output of the whole machine. As shown in FIG. 1, the non-uniform speed regulating signal curve causes the controller to output a non-uniform duty cycle curve, resulting in obvious fluctuations when the motor speed changes.

SUMMARY

The technical problem to be solved by the present invention is to provide a rotation speed regulation system for an electric tool switch, whereby fluctuations caused by a change in the motor speed can be reduced or even eliminated.

In order to solve the above-mentioned technical problems, the present invention adopts the following technical solution. A rotation speed regulation system for an electric tool switch includes a controller, a resistance regulating copper foil which is electrically connected to the controller, and a resistance regulating reed matched with the resistance regulating copper foil. The resistance regulating copper foil includes a first foil and a second foil separated from each other. The first foil is an intact long strip foil. The second foil includes a plurality of short-circuit gold fingers arranged at equal intervals in the middle part of the second foil and a full-resistance foil and a zero-resistance foil at both ends of the second foil. The short-circuit gold fingers in the middle part are arranged in sequence from one end of the full-resistance foil to one end of the zero-resistance foil. The short-circuit gold fingers, the zero-resistance foil and the full-resistance foil are sequentially connected in series through a resistor. The zero-resistance foil is electrically connected to the controller. The resistance regulating reed is bridged between the first foil and the second foil. One end of the resistance regulating reed contacting the first foil is a constant contact end, and the other end of the resistance regulating reed contacting the second foil is a resistance regulating contact end. A straight contact strip is formed between the resistance regulating contact end and the second foil. The contact strip is perpendicular to a sliding direction of the resistance regulating contact end on the second foil. The width of the short-circuit gold finger is 0.27 mm, and the distance between two adjacent short-circuit gold fingers is 0.2 mm. An inclination angle $\alpha$ is formed between the short-circuit gold finger and the sliding direction of the resistance regulating contact end. $\alpha$ is 107°-110° and the length L of the contact strip is 2.3-2.9 mm.

Preferably, the zero-resistance foil, the short-circuit gold fingers and the full-resistance foil are equidistantly spaced.

Preferably, the length direction of the first foil coincides with the length direction of the second foil.

Preferably, the inclination angle $\alpha$ is 108.5° and the length of the contact strip is 2.6 mm.

The advantages of the present invention are as follows. By optimizing the inclination angle of the short-circuit gold fingers relative to the sliding direction of the resistance regulating contact end and the length of the contact strip formed by the resistance regulating contact end on the second foil, the speed regulating signal received by the controller changes uniformly when the resistance regulating reed moves in the resistance regulating stroke, so as to obtain uniform speed output of the whole machine. In this way, fluctuations caused by a change in the motor speed are reduced or even eliminated.

BRIEF DESCRIPTION OF THE DRAWINGS

The specific embodiments of the present invention are further described in combination with the drawings, wherein:

In FIGS. 1-6: 1, controller; 2, resistance regulating copper foil; 201, first foil; 202, second foil; 2021, short-circuit gold finger; 2022, full-resistance foil; 2023, zero-resistance foil; 3, resistance regulating reed; 301, constant contact end; 302, resistance regulating contact end; 4, contact strip.

DETAILED DESCRIPTION OF THE EMBODIMENTS

The specific embodiments of the present invention are described in detail below in combination with the drawings.

Embodiment 1

Figure 1:
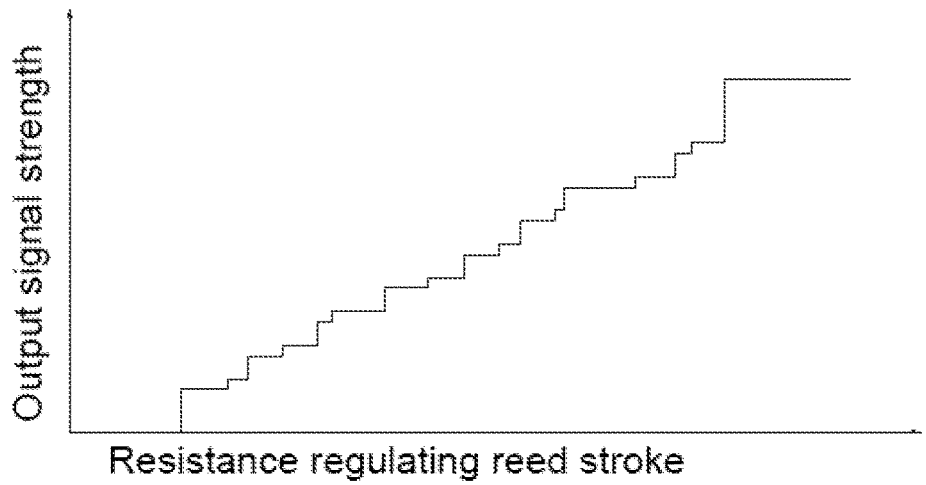
FIG. 1 is a chart showing a speed regulating signal curve output by a traditional rotation speed regulation system.
Figure 2:
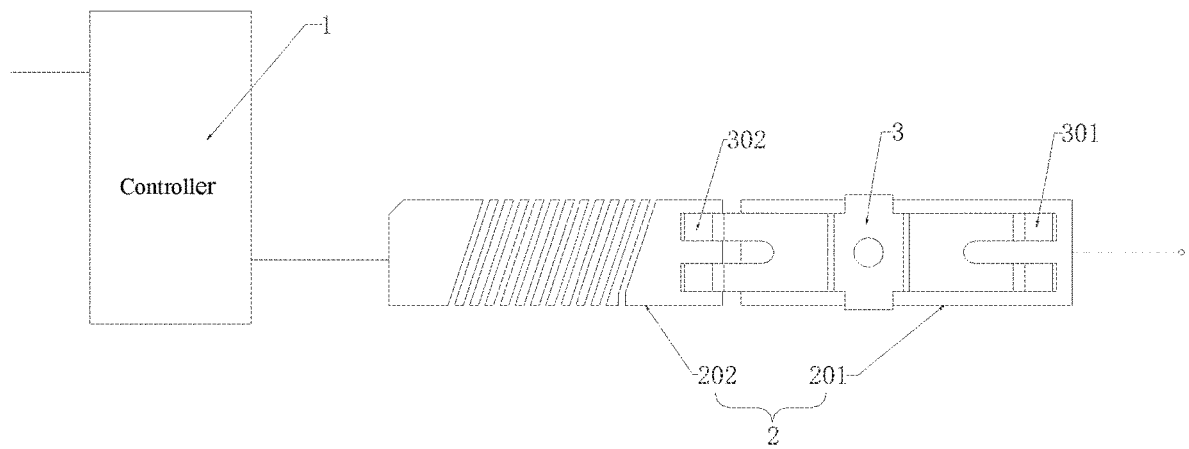
FIG. 2 is a structural schematic illustration of the present invention.
Figure 3:
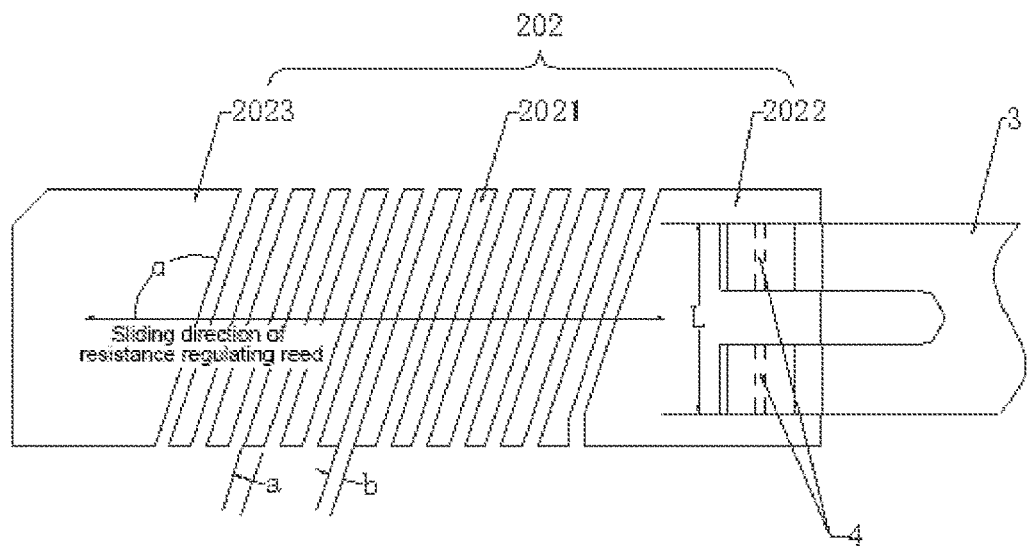
FIG. 3 is a schematic illustration showing the specific structure of the second foil of the present invention.
Figure 4:
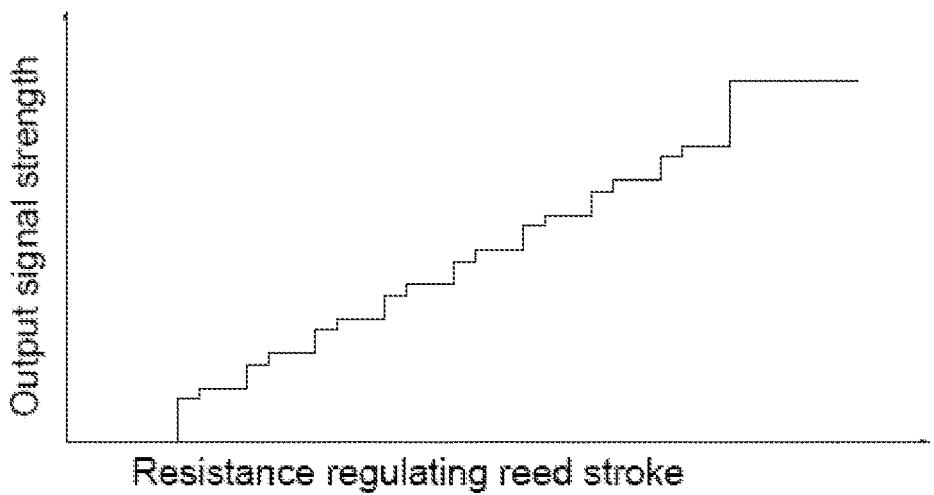
FIG. 4 is a chart showing a speed regulating signal curve output by embodiment 1 of the present invention.

As shown in FIGS. 2-3, the rotation speed regulation system for the electric tool switch includes the controller 1, the resistance regulating copper foil 2 electrically connected to the controller 1, and the resistance regulating reed 3 matched with the resistance regulating copper foil 2. The resistance regulating copper foil 2 includes the first foil 201 and the second foil 202 separated from each other. The length direction of the first foil 201 coincides with the length direction of the second foil 202. The first foil 201 is an intact long strip foil. The second foil 202 includes a plurality of short-circuit gold fingers 2021 arranged at equal intervals in the middle part of the second foil 202 and the full-resistance foil 2022 and the zero-resistance foil 2023 at both ends of the second foil 202. The zero-resistance foil 2023, the short-circuit gold fingers 2021 and the full-resistance foil 2022 are equidistantly spaced. The short-circuit gold fingers 2021 in the middle part are arranged in sequence from one end of the full-resistance foil 2022 to one end of the zero-resistance foil 2023. The short-circuit gold fingers 2021, the zero-resistance foil 2023 and the full-resistance foil 2022 are sequentially connected in series through a resistor. The zero-resistance foil 2023 is electrically connected to the controller 1. The resistance regulating reed 3 is bridged between the first foil 201 and the second foil 202. One end of the resistance regulating reed 3 contacting the first foil 201 is the constant contact end 301, and the other end of the resistance regulating reed 3 contacting the second foil 202 is the resistance regulating contact end 302. The straight contact strip 4 is formed between the resistance regulating contact end 302 and the second foil 202, and the contact strip 4 is perpendicular to the sliding direction of the resistance regulating contact end 302 on the second foil 202. The width a of the short-circuit gold finger is 0.27 mm, and the distance b between two adjacent short-circuit gold fingers 2021 is 0.2 mm. The inclination angle $\alpha$ is formed between the short-circuit gold finger 2021 and the sliding direction of the resistance regulating contact end 302, $\alpha=107°$ and the length L of the contact strip 4 is 2.3 mm. FIG. 4 schematically shows the speed regulating signal curve received by the controller 1 of the rotation speed regulation system fabricated according to this set of technical parameters mentioned above.

In the present embodiment, as shown in FIG. 2, the upper and lower ends of the contact strip 4 determine the short-circuit gold finger 2021 and the short-circuited resistor that the contact strip 4 specifically contacts. Therefore, even if the middle of the contact strip 4 is disconnected to form two sections, the length L of the contact strip 4 is still calculated according to the distance between the upper and lower ends of the whole contact strip 4.

Embodiment 2

Figure 5:
FIG. 5 is a chart showing a speed regulating signal curve output by embodiment 2 of the present invention.

The present embodiment is roughly the same as embodiment 1. The difference thereof is only the inclination angle $\alpha$ of the short-circuit gold finger 2021 and the length L of the contact strip 4 that are further optimized. In the present embodiment, the inclination angle $\alpha=108.5°$, and the length L=2.6 mm. FIG. 5 schematically shows the speed adjusting signal curve received by the controller 1 of the rotation speed regulation system fabricated according to this set of technical parameters mentioned above.

Embodiment 3

Figure 6:
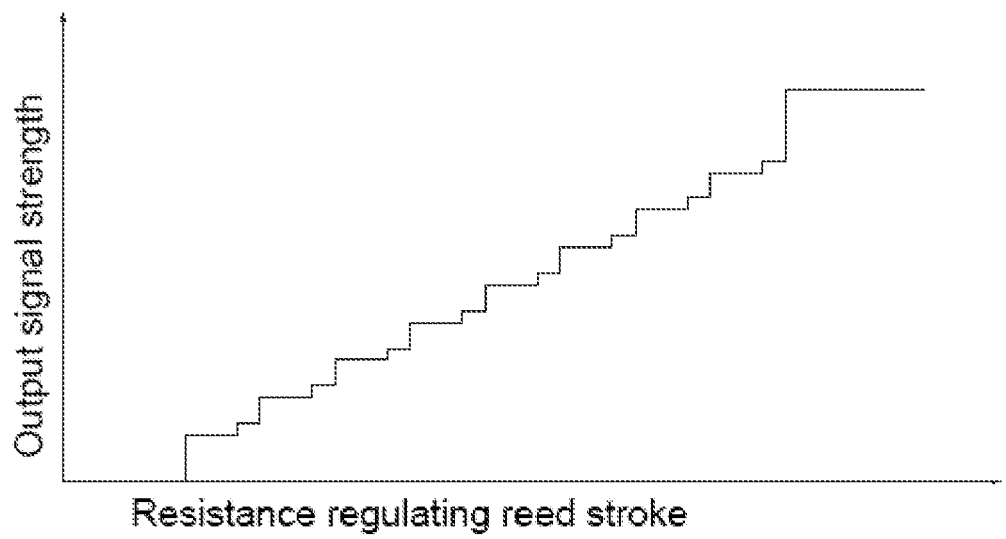
FIG. 6 is a chart showing a speed regulating signal curve output by embodiment 3 of the present invention.

The present embodiment is roughly the same as embodiment 1. The difference thereof is only the inclination angle $\alpha$ of the short-circuit gold finger 2021 and the length L of the contact strip 4 that are further optimized. In the present embodiment, the inclination angle $\alpha=110°$ and the length L=2.9 mm. FIG. 6 schematically shows the speed adjusting signal curve received by the controller 1 of the rotation speed regulation system fabricated according to this set of technical parameters mentioned above.

In the above three embodiments, the output signal strength in FIGS. 4-6 is the magnitude of the current, and the stroke of the resistance regulating reed is the distance that the contact strip 4 moves from the full-resistance foil 2022 to the zero-resistance foil 2023.

The working process of the present invention is as follows. As shown in FIG. 2 and FIG. 3, when the rotation speed regulation system of the present invention is in use, the first foil 201 is connected to a low-voltage signal power supply, and the controller 1 is connected to the zero-resistance foil 2023 to detect the magnitude of the current flowing through the resistance regulating copper foil 2. When the resistance regulating contact end 302 is located on the full-resistance foil 2022, the resistance of the resistance regulating copper foil 2 connected to the circuit is the maximum, and the current on the resistance regulating copper foil 2 detected by the controller 1 is the minimum. According to the magnitude of the current, the controller 1 adjusts the duty cycle of the pulse signal to a pre-stored duty cycle corresponding to the magnitude of the current, wherein the pulse signal is output by the controller 1 and configured for controlling the rotation of the motor. When gradually sliding from the full-resistance foil 2022 to the zero-resistance foil 2023, the resistance regulating reed 3 gradually short-circuits the resistor that the resistance regulating reed 3 slides over, wherein the resistor is connected to the short-circuit gold finger 2021. In this way, the resistance value of the resistance regulating copper foil 2 actually connected to the circuit decreases, the current on the resistance regulating copper foil 2 detected by the controller 1 gradually increases, and the controller 1 adjusts the duty cycle of the pulse signal output by the controller 1 according to the current magnitude detected in real time.

In the present invention, since the resistance value of the series resistance between the gold fingers is a fixed value, when sliding the resistance regulating reed 3, the resistance changes in a stepwise fashion shown in FIG. 1 and FIGS. 4-6 rather than in a linear fashion. In the sliding process of the resistance regulating reed 3, each time the resistance value of the resistance regulating copper foil 2 actually connected to the circuit changes, the resistance regulating reed 3 accordingly slides approximately the same distance, indicating that the speed regulating signal curve is more uniform. FIG. 5 shows the optimal implementation effect in the present invention. When adopting the technical parameters described in embodiment 2, a speed regulating signal curve that changes almost uniformly is obtained. In embodiment 2, each time the resistance value of the resistance regulating copper foil 2 actually connected to the circuit changes (the resistance value changes, causing the current to change accordingly), the resistance regulating reed 3 accordingly slides approximately the same distance.

As shown in FIG. 4 and FIG. 6, the technical parameters adopted in embodiment 1 and embodiment 3 can also effectively improve the uniformity of the speed regulating signal curve, but are slightly less effective than those of embodiment 2 in terms of effects.

The above-mentioned embodiments are only intended to illustrate the principle and efficacy of the present invention, as well as some application embodiments, rather than to limit the present invention. It should be noted that for ordinary artisans in the art, some modifications and improvements can be made without departing from the inventive concept of the present invention, and these modifications and improvements shall fall within the scope of protection of the present invention.

What is claimed is:

1. A rotation speed regulation system for an electric tool switch, comprising a controller, a resistance regulating copper foil electrically connected to the controller, and a resistance regulating reed matched with the resistance regulating copper foil, wherein the resistance regulating copper foil comprises a first foil and a second foil, wherein the first foil and the second foil are separated from each other;

the first foil is an intact long strip foil;

the second foil comprises a plurality of short-circuit gold fingers, a full-resistance foil and a zero-resistance foil; wherein the plurality of short-circuit gold fingers are arranged at equal intervals in a middle part of the second foil;

the full-resistance foil and the zero-resistance foil are arranged at both ends of the second foil, respectively;

the plurality of short-circuit gold fingers in the middle part are arranged in sequence from one end of the full-resistance foil to one end of the zero-resistance foil, and the plurality of short-circuit gold fingers, the zero-resistance foil and the full-resistance foil are sequentially connected in series through a resistor;

the zero-resistance foil is electrically connected to the controller;

the resistance regulating reed is bridged between the first foil and the second foil;

a first end of the resistance regulating reed contacting the first foil is a constant contact end, and a second end of the resistance regulating reed contacting the second foil is a resistance regulating contact end;

a straight contact strip is formed between the resistance regulating contact end and the second foil, and the contact strip is perpendicular to a sliding direction of the resistance regulating contact end on the second foil;

a width of a short-circuit gold finger of the plurality of short-circuit gold fingers is 0.27 mm, and a distance between two adjacent short-circuit gold fingers is 0.2 mm; and an inclination angle $\alpha$ is formed between the short-circuit gold finger and the sliding direction of the resistance regulating contact end, $\alpha$ is 107°-110° and a length L of the contact strip is 2.3-2.9 mm.

2. The rotation speed regulation system according to claim 1, wherein the zero-resistance foil, the short-circuit gold fingers and the full-resistance foil are equidistantly spaced.

3. The rotation speed regulation system according to claim 1, wherein a length direction of the first foil coincides with a length direction of the second foil.

4. The rotation speed regulation system according to claim 1, wherein the inclination angle $\alpha$ is 108.5° and the length L of the contact strip is 2.6 mm.

* * * * *